3,345,385
D-HOMO STEROIDS CONTAINING A —CHO
GROUP IN 18-POSITION
Wataru Nagata, Hyogo Prefecture, Japan, assignor to
Shionogi & Co., Ltd., Osaka, Japan
No Drawing. Original application July 27, 1961, Ser. No. 127,097, now Patent No. 3,206,472, dated Sept. 14, 1965. Divided and this application May 12, 1965, Ser. No. 464,264
Claims priority, application Japan, Apr. 4, 1960, 35/20,125; Apr. 6, 1960, 35/20,723
2 Claims. (Cl. 260—340.9)

The present application is a division of copending patent application, Ser. No. 127,097, filed July 27, 1961 (now U.S. Pat. No. 3,206,472). Application Ser. No. 127,097 is a continuation-in-part of copending applications Ser. Nos. 93,869, 94,988, 98,334 and 103,741 filed respectively on Mar. 7, 1961, Mar. 13, 1961, Mar. 27, 1961, and Apr. 14, 1961 (all now abandoned).

This invention relates to compositions of matter, particularly organic compounds and their methods of preparation, and more especially to intermediates useful in the total synthesis of steroids and to the preparation of such intermediates. More particularly, the present invention is concerned with the provision of novel intermediates of the formula

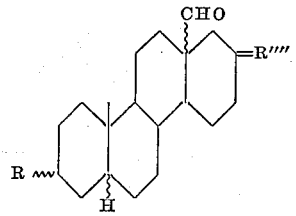

wherein R is a radical selected from the group consisting of oxo and ethylenedioxy when R is divalent, and from the group consisting of hydroxy and acetoxy when R is monovalent, R'''' is a radical selected from the group consisting of oxo and ethylenedioxy, and the ripple mark ($) is a generic indication of the α- and β-configuration.

Specifically, this invention relates to the aforesaid intermediates useful in a novel total synthesis of the steroids represented by the formula:

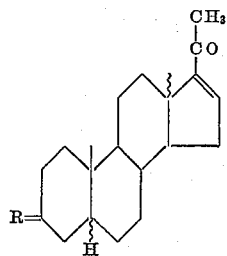

wherein R represents

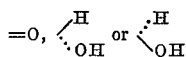

and the ripple mark ($) is a generic indication of both the α- and β-configurations, and intermediates thereof.

The following examples illustrate methods of carrying out the present invention, but it is to be understood that these examples are given for purposes of illustration and not of limitation.

In the examples which follow, the abbreviations and symbols have the following significances:
"g." means grams(s),
"l." means liter(s),
"ml." means milliliter(s),
"kg." means kilograms(s),
"mg." means milligram(s),
"hr." means hour(s),
"m." means molar,
"Anal. Calcd." means analysis calculated, and
"M.P." means melting point. Other abbreviations and symbols have conventional significances.

EXAMPLE 1

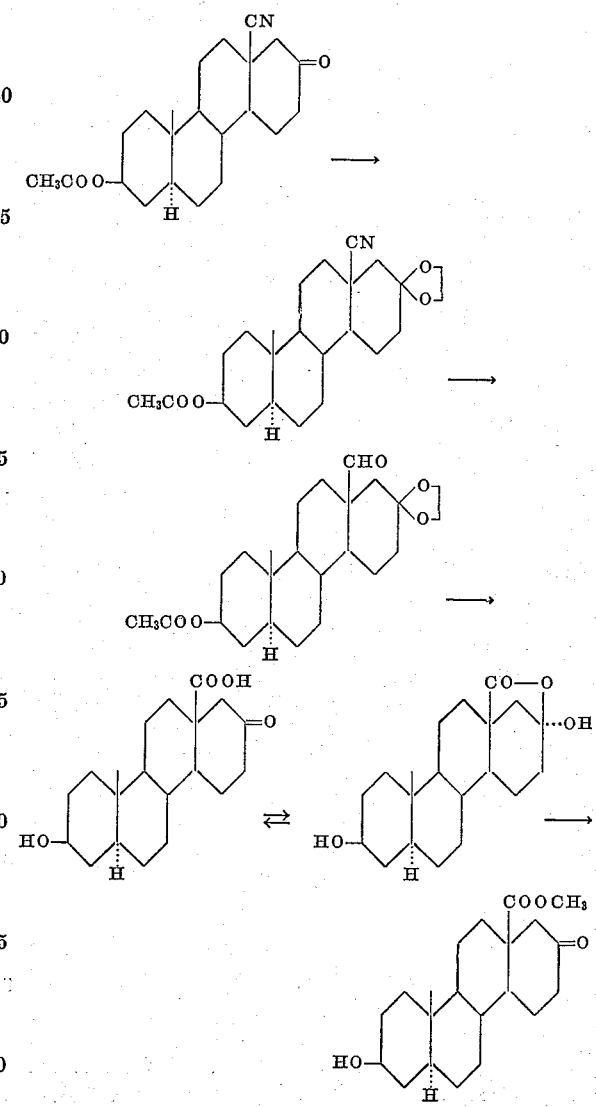

A solution of 160 mg. of dl-3β-acetoxy-13β-cyano-D-homo-5α-androstan-17-one ethylene ketal, which is obtained by ketalation of dl-3β-acetoxy-13β-cyano-D-homo-5α-androstan-17-one with ethylene glycol, in 8 ml. of tetrahydrofuran is stirred dropwise with external ice-cooling and in the course of 5 minutes into a solution of lithium aluminum diethoxyhydride in tetrahydrofuran, prepared from 15.5 ml. of 0.312 M-lithium aluminum hydride solution in tetrahydrofuran and 350 mg. of ethyl acetate. The mixture is stirred for 30 minutes under ice-cooling and then 3.5 hours at room temperature, cooled, and 4 ml. of 0.886 M-sodium potassium tartrate solution and 0.36 ml. of 0.5 M-tartaric acid solution added. The reaction mixture is extracted 3 times with chloroform. The combined extract is washed with water, dried, and distilled under reduced pressure to give 214 mg. of residue. This corresponds to a mixture of an iminomethyl compound and a small quantity of an aldehyde and the starting cyano compound, as interpreted by IR determination, thus shows absorption at 3508 and 3458 corresponding to OH, 3258 and 1635 corresponding to —CH=NH group, 2218 corresponding to CN, and 2700 and 1716 cm.$^{-1}$ corresponding to CHO group. The residue is dissolved in 9 ml. of methanol, and after addition of 1 ml. of 2 N-sodium hydroxide, refluxed for 5 minutes. After neutralization with acetic acid, the reaction mixture is extracted 3 times with chloroform. The combined extract is washed with water, dried, solvent distilled off under reduced pressure, and is subjected to acetylation with 3 ml. of acetic anhydride and 5 ml. of anhydrous pyridine at room temperature for 1 night. The crude product, 224 mg., is chromatographed on alumina (Welm III, neutral). From the fraction of petroleum ether-benzene (4:1–7:3) 34.8 mg. of dl-3β-acetoxy-17-oxo-D-homo-5α-androstan-18-al 17-ethylene ketal, M.P. 172–179° C. (with foaming), is obtained after recrystallization from acetone-ether.

IR: $\nu_{max.}^{Nujol}$ 2742 (CHO), 2680 (CHO), 1726 (CH$_3$COO, CHO), 1708 (CHO); 1122, 1099 (ethylene ketal); 1247, 1022 (CH$_3$COO) cm.$^{-1}$.

Anal. Calcd. for C$_{24}$H$_{36}$O$_5$ (404.53): C, 71.25; H, 8.91. Found: C, 71.00; H, 8.92.

The second fraction of petroleum ether-benzene (3:2–3:7) gives 62 mg. of the starting material, M.P. 230–237° C., after recrystallization from acetone-ether.

Eighty mg. of dl-3β-acetoxy-17-oxo-D-homo-5α-androstan-18-al 17-ethylene ketal are dissolved in 15 ml. of acetone, freshly distilled after treatment with potassium permanganate, and added dropwise with 0.5 ml. of 8 N chromic-sulfuric acid mixture (J. Chem. Soc., 1953, 2548) with stirring. The further stirring is continued for 20 minutes. Then, the reaction mixture has added thereto 5 drops of methanol and 50 ml. of water and is extracted 3 times with chloroform. The extracts are combined, washed with water, and dried over sodium sulfate. After removing the solvent, the residue (119 mg.) is dissolved in 10 ml. of acetone, 2 N hydrochloric acid (2 ml.) added and the mixture boiled for 30 minutes. After the addition of anhydrous sodium acetate (300 mg.), the mixture (124.3 mg.) is dissolved in 1 ml. of N-sodium carbonate and 10 ml. of methanol and boiled for 1.5 hrs. After removing methanol by distillation, water is added to the residual solution, which is extracted 3 times with chloroform. The chloroform solution is extracted twice with 2 N sodium hydroxide. The combined alkaline extracts are adjusted to pH 3 by the addition of concentrated hydrochloric acid under cooling, and extracted with chloroform. The extracts are washed with water, dried and distilled to give 37 mg. of crude crystals of dl-3β-hydroxy-17-oxo-D-homo-5α-androstan-18-oic acid. This equilibrates with the hemiketal lactone form. This forms leaflet crystals of M.P. 310° C. (with decomposition) by recrystallization from chloroform-acetone.

IR: $\nu_{max.}^{CHCl_3}$ 3540, 3265 (OH); 1733 (hemiketal lactone), 1710 (COOH, CO) cm.$^{-1}$.

Anal. Calcd. for C$_{20}$H$_{30}$O$_4$ (334.44): C, 71.82; H, 9.04. Found: C, 71.82; H, 9.14.

Thus obtained dl-3β-hydroxy-17-oxo-D-homo-5α-androstan-18-oic acid (37 mg.) is esterified by ethereal solution of diazomethane in dioxane and treated as usual to obtain crude methyl ester (36.8 mg.). Further recrystallization from acetone-ether gives pure prismatic crystals of methyl dl-3β-hydroxy-17-oxo-D-homo-5α-androstan-18-oate, M.P. 193–194° C.

EXAMPLE 2

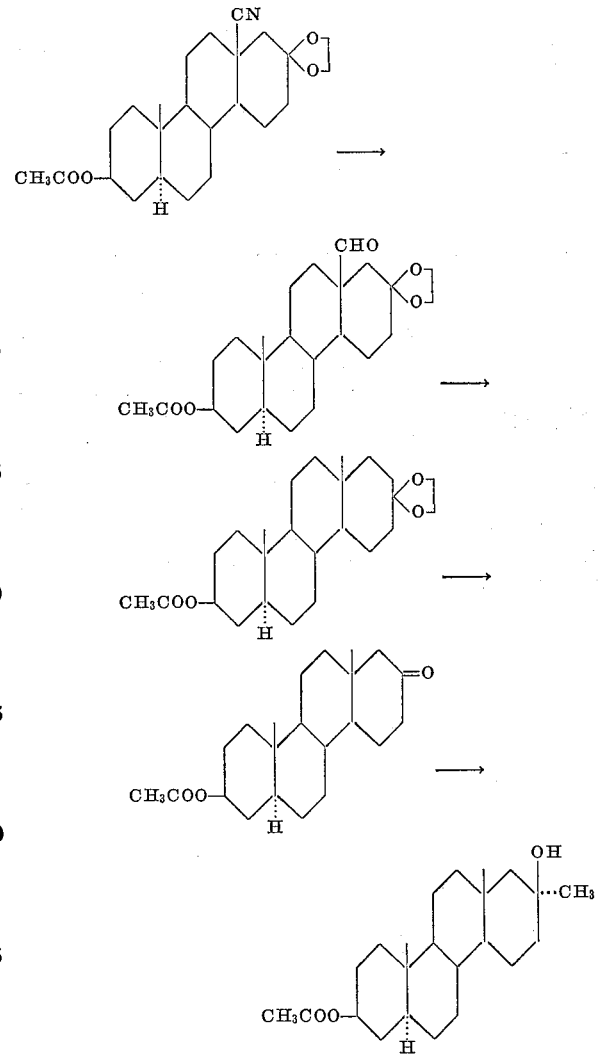

A solution of 138.5 mg. of dl-3β-acetoxy-13β-cyano-D-homo-5α-androstan-17-one ethylene ketal in 10 ml. of tetrahydrofuran is added to 20 ml. of 0.172 M-lithium aluminum hydride solution in tetrahydrofuran under ice-cooling and stirring in the course of 30 minutes and the stirring is continued at room temperature for 3 more hours. The reaction mixture is cooled, 10 ml. of water added, and then refluxed for 8 minutes to hydrolyze the imino compound. After concentration to a half volume under reduced pressure, the reaction mixture is neutralized by acetic acid and extracted 3 times with chloroform. The chloroform solution is washed with water, dried and distilled to remove the solvent. To the residue (142.4 mg.) is added 1.5 ml. of acetic anhydride and 2.5 ml. of pyridine and the whole allowed to stand overnight at room temperature. The crude acetylated product obtained in conventional manner from the above reaction mixture, 160 mg., is chromatographed on 8 g. of alumina (Welm III, neutral). From the fraction of petroleum ether-benzene (9:1–2:1), 50.3 mg. of dl-3β-acetoxy-17-oxo-D-homo-5α-androstan-18-al 17-ethylene ketal are obtained as crystals, M.P. 170–179° C., after recrystallization with acetone-ether. By further recrystallization, the mother liquor gives 20.4 mg. more of the crystals.

Thus obtained dl-3β-acetoxy-17-oxo-D-homo-5α-androstan-18-aldehyde 17-ethylene ketal (60 mg.) is admixed with potassium hydroxide (106 mg.), 80% hydrazine hydrate (0.3 ml.) and triethyleneglycol (2 ml.) and heated at 130–135° C. for 1 hr. The reaction temperature is gradually elevated. During the elevation, excess of hydrazine hydrate and water are distilled off. Then, the mixture is heated at 210–220° C. for 3 hrs. After cooling, the mixture is poured into ice-water and extracted with chloroform. The extract is washed with water, dried and evaporated to dryness. The residue (65.9 mg.) is recrystallized from ethanol to give dl-3β-hydroxy-D-homo-5α-androstan-17-one ethylene ketal (34.8 mg.), as plates, M.P. 221–223° C.

IR (Nujol): 3602, 3551, 1102, 1075 cm.$^{-1}$.

Anal. Calcd. for $C_{22}H_{36}O_3$ (348.51): C, 75.81; H, 10.41. Found: C, 75.71; H, 10.38.

Acetylation of dl-3β-hydroxy-D-homo-5α-androstan-17-one ethyleneketal gives dl-3β-acetoxy-D-homo-5α-androstan-17-one ethyleneketal, M.P. 164–166/173–174° C.

IR (Nujol): 1731, 1241, 1028, 1020, 1102, 1078 cm.$^{-1}$.

Anal. Calcd. for $C_{24}H_{38}O_4$ (390.54): C, 73.80; H, 9.81. Found: C, 73.76; H, 9.80.

Deketalization of dl-3β-acetoxy-D-homo-5α-androstan-17-one ethyleneketal gives dl-3β-acetoxy-D-homo-5α-androstan-17-one, M.P. 160–163° C.

IR (Nujol): 1739, 1711, 1248, 1239, 1928 cm.$^{-1}$.

Anal. Calcd. for $C_{22}H_{34}O_3$ (346.49): C, 76.26; H, 9.89. Found: C, 76.30; H, 9.77.

To an ether solution of Grignard reagent which is prepared from methyl iodide (2.07 g.) and magnesium (356 mg.) in anhydrous ether (14 ml.) is added dropwise another solution of dl-3β-acetoxy-D-homo-5α-androstan-17-one (513.7 mg.) in anhydrous benzene (15 ml.) with stirring under ice-cooling. The dropwise addition takes 20 mins. The mixture is stirred for 1 hr. at room temperature and ether is distilled off. After addition of anhydrous benzene (30 ml.), the mixture is refluxed for 2.5 hrs. Then the mixture is ice-cooled, N-hydrochloric acid (20 ml.) is added and the mixture is extracted 5 times with chloroform-methanol (3:1). The extract is washed twice with a half-saturated aqueous solution of sodium sulfate, dried over anhydrous sodium sulfate, and evaporated. To the residue (623.9 mg.) are added acetic anhydride (4 ml.) and dry pyridine (5 ml.) and allowed to stand overnight at room temperature. Thus obtained crude acetate (671.6 mg.) is recrystallized from acetone-ether to give 17α - methyl - D - homo - androstan - 3β,17β - diol - 3β-acetate (291.1 mg.) as prisms, M.P. 142–144/162–163° C. (it melts once at 142–144° C., then solidifies and melts again at 162–163° C.). Then, 151.2 mg. more of the product are obtained from the mother liquor. Totally, 442.3 mg. of 17α-methyl-D-homo-5α-androstan-3β,17β-diol 3-acetate are obtained.

IR: $\nu_{max.}^{CHCl_3}$ 3625, 3505 (OH), 1726, 1249, 1025 ($CH_3COO$) cm.$^{-1}$.

Anal. Calcd. for $C_{23}H_{38}O_3$ (362.53): C, 76.19; H, 10.57. Found: C, 76.22; H, 10.60.

The configuration of the methyl radical in the 17-position is confirmed synthetically.

EXAMPLE 3

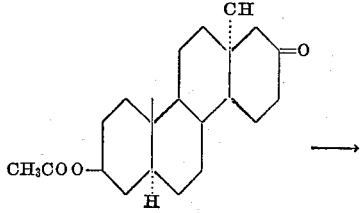

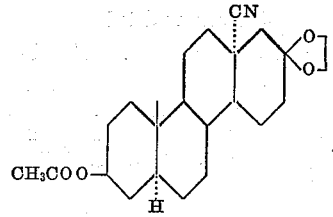

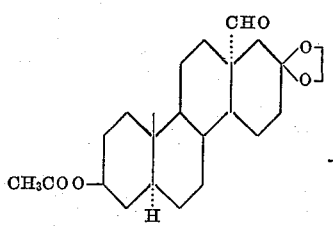

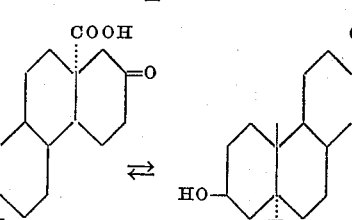

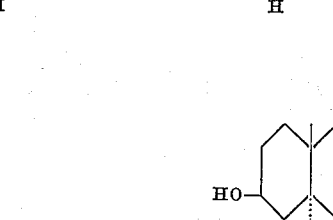

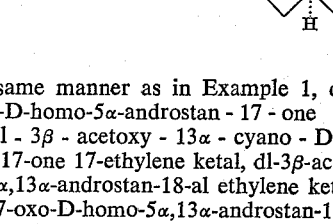

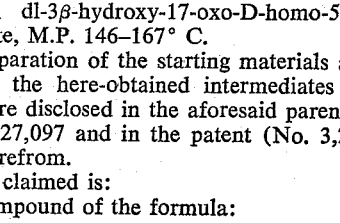

In the same manner as in Example 1, dl-3β-acetoxy-13α-cyano-D-homo-5α-androstan - 17 - one is converted through dl - 3β - acetoxy - 13α - cyano - D - homo - 5α-androstan-17-one 17-ethylene ketal, dl-3β-acetoxy-17-oxo-D-homo-5α,13α-androstan-18-al ethylene ketal and dl-3β-hydroxy-17-oxo-D-homo-5α,13α-androstan-18-oic acid into methyl dl-3β-hydroxy-17-oxo-D-homo-5α,13α-androstan-18-oate, M.P. 146–167° C.

The preparation of the starting materials and the conversion of the here-obtained intermediates to steroidal products are disclosed in the aforesaid parent application Ser. No. 127,097 and in the patent (No. 3,206,472) resulting therefrom.

What is claimed is:
1. A compound of the formula:

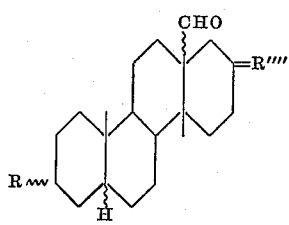

wherein R is a radical selected from the group consisting of oxo and ethylenedioxy when R is divalent, and from the group consisting of hydroxy and acetoxy when R is monovalent, R'''' is a radical selected from the group consisting of oxo and ethylenedioxy, and the ripple mark (∫) is a generic indication of the α- and β-configurations.

2. 3β - acetoxy - 17 - oxo - D - homo - 5α - androstan-18-al 17-ethylene ketal.

(References on following page)

References Cited

UNITED STATES PATENTS

| | | | |
|---|---|---|---|
| 1,915,334 | 6/1933 | Salzberg et al. | 260—243 |
| 2,362,614 | 11/1944 | Calva | 167—22 |
| 2,739,972 | 3/1956 | Abbott et al. | 260—340.9 |
| 2,847,445 | 8/1958 | Mikeska | 260—465 |
| 2,946,805 | 7/1960 | Kleinschmidt | 260—326.5 |
| 3,153,087 | 10/1964 | Kramer et al. | 260—515 |

ALEX MAZEL, *Primary Examiner.*

NICHOLAS S. RIZZO, *Examiner.*

J. TOVAR, J. TURNIPSEED, *Assistant Examiners.*